(12) United States Patent
Gale et al.

(10) Patent No.: US 12,585,399 B2
(45) Date of Patent: Mar. 24, 2026

(54) IN-PLACE SORTING

(71) Applicant: GDM Holding LLC, Mountain View, CA (US)

(72) Inventors: Trevor Gale, New York, NY (US); Albert Borchers, La Selva Beach, CA (US); Rastislav Bodik, Berkeley, CA (US); Danilo Carvalho Martins, Palo Alto, CA (US)

(73) Assignee: GDM HOLDING LLC, Mountain View, CA (US)

( * ) Notice: Subject to any disclaimer, the term of this patent is extended or adjusted under 35 U.S.C. 154(b) by 0 days.

(21) Appl. No.: 18/749,344

(22) Filed: Jun. 20, 2024

(65) Prior Publication Data

US 2025/0390245 A1 Dec. 25, 2025

(51) Int. Cl.
*G06F 3/06* (2006.01)
*G06F 7/26* (2006.01)

(52) U.S. Cl.
CPC .......... *G06F 3/0647* (2013.01); *G06F 3/0604* (2013.01); *G06F 3/0673* (2013.01); *G06F 7/26* (2013.01); *G06F 3/0626* (2013.01)

(58) Field of Classification Search
CPC .... G06F 3/0647; G06F 3/0604; G06F 3/0673; G06F 3/0626; G06F 7/26
See application file for complete search history.

(56) References Cited

U.S. PATENT DOCUMENTS

| | | | | |
|---|---|---|---|---|
| 2015/0212797 A1* | 7/2015 | Bordawekar | ............. | G06F 7/36 |
| | | | | 707/753 |
| 2024/0111826 A1* | 4/2024 | Chen | ......................... | G06T 1/20 |

FOREIGN PATENT DOCUMENTS

| | | | | | |
|---|---|---|---|---|---|
| GB | 2284079 A | * | 5/1995 | ............... | G06F 7/36 |

OTHER PUBLICATIONS

Axtmann, Michael, et al. In-Place Parallel Super Scalar Samplesort (IPSS$^4$o). arXiv:1705.02257, arXiv, Jun. 29, 2017. arXiv.org, https://doi.org/10.48550/arXiv.1705.02257. (Year: 2017).*
Schöner, Sebastian. "A Sort of Sorts—Parallel Sorting with Sample Sort." Sebastian Schöner, May 24, 2021, https://blog.s-schoener.com/2021-05-24-parallel-sorting/ (Year: 2021).*

(Continued)

*Primary Examiner* — Reginald G Bragdon
*Assistant Examiner* — Zakaria Mohammed Belkhayat
(74) *Attorney, Agent, or Firm* — Gray Ice Higdon

(57) ABSTRACT

Implementations described herein relate to improved in-place sample sorting of data. In various implementations, unsorted elements of a set stored in a first memory segment may be compared to splitter values to determine respective counts of elements of the set that will fit into each of a plurality of buckets bounded by the splitter values. Some number of elements from each of multiple ranges of the first memory segment that correspond to the multiple buckets may be moved to a smaller second memory segment. Remaining elements may be redistributed from at least some of the plurality of ranges of the first memory segment across the plurality of ranges based on comparing the remaining elements to the splitter values. The elements from the second memory segment may then be distributed across the plurality of ranges based on comparing the elements to the splitter values.

20 Claims, 6 Drawing Sheets

(56) References Cited

OTHER PUBLICATIONS

PassMark—Intel Xeon E5-4640 @ 2.40GHz—Price Performance Comparison. Feb. 15, 2024, https://web.archive.org/web/20240215014426/https://www.cpubenchmark.net/cpu.php?cpu=Intel+Xeon+E5-4640+%40+2.40GHz&id=1224. (Year: 2024).*
Blacher et al., "Vectorized and performance-portable Quicksort" arXiv:2205.05982v1 [cs.IR], 21 pages, dated May 12, 2022.
Gale et al., "Bounds for a Continuous Balls and Bins Problem" 5 pages, dated Feb. 21, 2024.
European Patent Office, Communication issued in Application No. 25179598.5, 8 pages, dated Nov. 17, 2025.
Axtmann M., et al.; Engineering In-place (Shared-memory) Sorting Algorithms ACM Transactions On Parallel Computing, vol. 9, No. 1, pp. 1-62, XP058690826, dated Jan. 31, 2022.
Blelloch G., et al.: "Sorting with 1-15 Asymmetric Read and Write Costs", Arxiv.Org, XP080688610, DOI: 10.1145/2755573.2755604, 23 pages, dated Mar. 11, 2016.

* cited by examiner

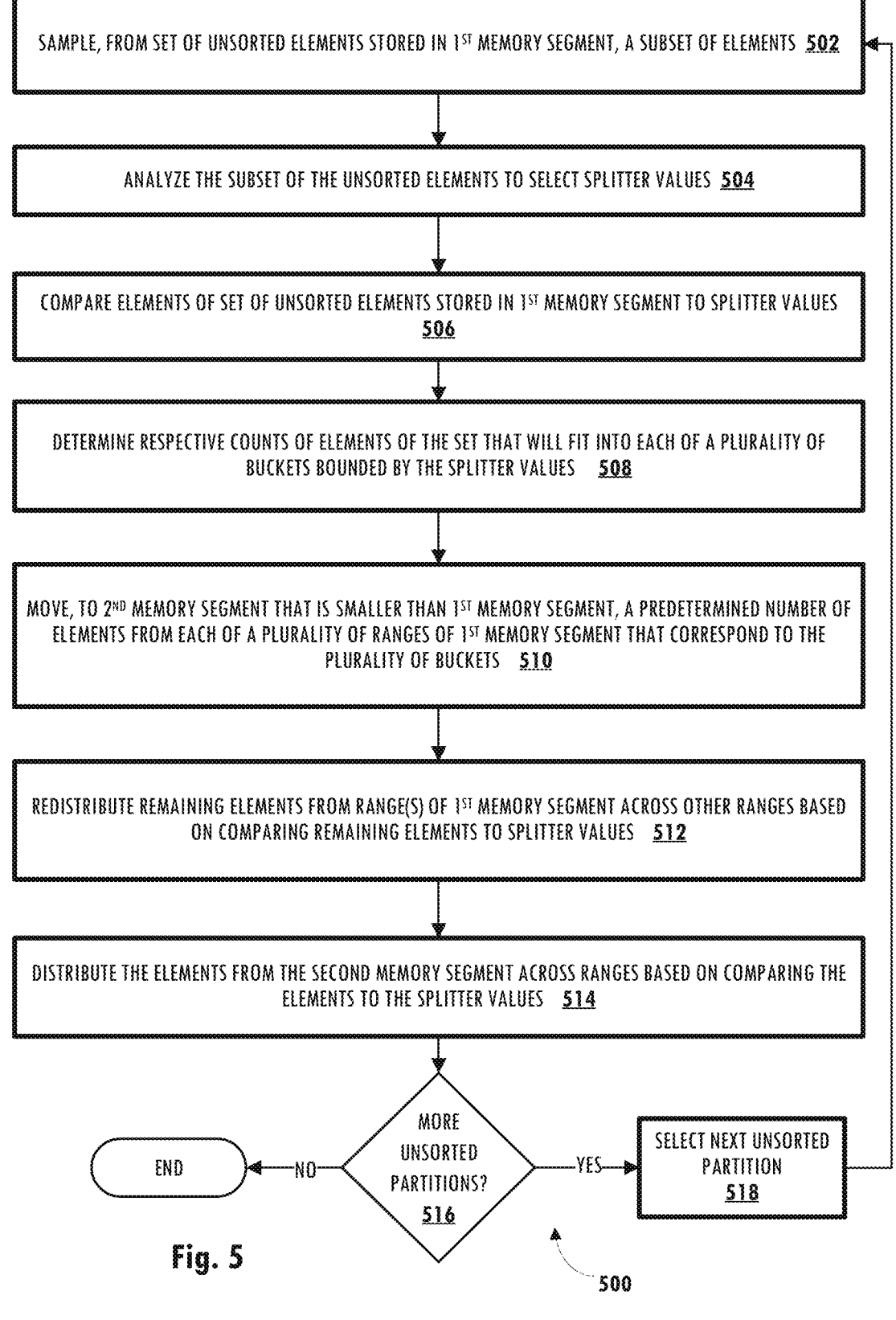

SAMPLE, FROM SET OF UNSORTED ELEMENTS STORED IN 1ST MEMORY SEGMENT, A SUBSET OF ELEMENTS  502

ANALYZE THE SUBSET OF THE UNSORTED ELEMENTS TO SELECT SPLITTER VALUES  504

COMPARE ELEMENTS OF SET OF UNSORTED ELEMENTS STORED IN 1ST MEMORY SEGMENT TO SPLITTER VALUES  506

DETERMINE RESPECTIVE COUNTS OF ELEMENTS OF THE SET THAT WILL FIT INTO EACH OF A PLURALITY OF BUCKETS BOUNDED BY THE SPLITTER VALUES  508

MOVE, TO 2ND MEMORY SEGMENT THAT IS SMALLER THAN 1ST MEMORY SEGMENT, A PREDETERMINED NUMBER OF ELEMENTS FROM EACH OF A PLURALITY OF RANGES OF 1ST MEMORY SEGMENT THAT CORRESPOND TO THE PLURALITY OF BUCKETS  510

REDISTRIBUTE REMAINING ELEMENTS FROM RANGE(S) OF 1ST MEMORY SEGMENT ACROSS OTHER RANGES BASED ON COMPARING REMAINING ELEMENTS TO SPLITTER VALUES  512

DISTRIBUTE THE ELEMENTS FROM THE SECOND MEMORY SEGMENT ACROSS RANGES BASED ON COMPARING THE ELEMENTS TO THE SPLITTER VALUES  514

MORE UNSORTED PARTITIONS?  516

END

NO

YES

SELECT NEXT UNSORTED PARTITION  518

IN-PLACE SORTING

BACKGROUND

A variety of different algorithms exist to sort a list of n
elements (or "keys") using computers. Each algorithm may
be well-suited for particular circumstances and/or hardware.
Merge sort is a "divide and conquer" technique in which the
list of n unsorted elements is repeatedly divided into subsets
until each subset only has a single element, at which point
merge sort recursively merges those subsets into a sorted list
of n elements. Quick sort is another divide and conquer
technique in which a "pivot" or "splitter" element is sampled
from the list, and other elements are partitioned into subar-
rays according to whether they are greater than or less than
the pivot element. These subarrays are sorted recursively in
a similar fashion, until a sorted list of n elements emerges.

Some sorting techniques may be considered "in-place"
because they operate directly on the list in memory. Any
extra space required, if at all, need not be proportional to the
overall size n of the list. Bubble sort, selection sort, heapsort,
and quick sort are a few examples of in-place sorting
techniques. Other sorting techniques may be considered
"out-of-place" or "not-in-place" because they require sig-
nificant extra storage, often in proportion to the overall size
n of the list. This extra memory burden can make sorting
large lists computationally expensive, impractical, or even
impracticable. Merge sort and super scalar sample sort
($S^3$-sort) are two examples of out-of-place sorting tech-
niques that require significant (e.g., O(n)) extra space, e.g.,
for merging or storing bucket assignments (sometimes
referred to as "oracles").

SUMMARY

In-place sorting techniques have the benefit of using less memory than out-of-place sorting techniques. However,
they may require numerous memory accesses. For instance,
a local classification phase of some types of in-place sorting
techniques may read each value from an input buffer and
write to a block buffer. When the block buffer is full, the
value may be read from the block buffer and written to the
input. Assuming the problem size in M bytes exceeds the
size of a last level of cache, 2 M bytes of memory bandwidth
may be required. In other words, a significant burden is
placed on memory bandwidth and/or a cache hierarchy when
a large amount of data is being sorted.

This may be acceptable on x86 architectures, which may
have 1-2 MB of L2 cache per core, and therefore can execute
two 512-bit loads and one 512-bit store every clock cycle.
Other architectures, however, may have less L2 cache per
core. On an x280 architecture, for instance, there is less than
or equal to 256 KB private L2 (pL2) cache per core, which
means either one 256-bit load or one 256-bit load may be
performed per clock cycle, not both. Other architectures may
have other amounts of private pL2 cache. To remain resident
on such a core, the block size for the block buffer would
need to be reduced. Similar issues arise with a block
permutation phase of certain types of in-place sorting tech-
niques.

Out-of-place sorting techniques may use less memory
bandwidth than in-place techniques but they can suffer from
excessive memory usage as the size of the data to be sorted
grows. With $S^3$-sort, for instance, M memory bandwidth
may be used for the counting phase and 3M memory
bandwidth may be used for the distribution phase. However,
when sorting billions or tens of billions of keys at a time, the additional storage cost associated with $S^3$-sort may be
prohibitive. Additionally, $S^3$-sort stores bucket assignments
for each element (called "oracles") that are calculated during
the counting phase to avoid recomputation during distribu-
tion, requiring an additional O(M) memory bandwidth and
storage.

Implementations described herein relate to improved in-
place sample sorting of data. In various implementations,
instead of using oracles to store bucket assignments, as is
done with $S^3$-sort, in-place two-way partitioning may be
performed between a first segment of memory that stores the
data to be sorted and a second segment of memory that is
significantly smaller than the first segment of memory (e.g.,
by order(s) of magnitude). The second segment of memory
may be used to temporarily store at least some elements of
the unsorted data, while other elements remaining in the first
memory segment are redistributed among a plurality of
buckets defined (e.g., bounded) by a plurality of splitter
values. In some implementations, once the elements that
remained in the first segment of memory are redistributed,
those elements that were temporarily stored in the second
segment of memory may be distributed back to the first
segment of memory. In some implementations, the process
may be repeated recursively for each of the buckets, which
may contain elements that are greater than or less than
elements of neighboring buckets, but that are yet unsorted
within each individual bucket.

In various implementations, a method may be imple-
mented using one or more processors and may include:
comparing elements of a set of unsorted elements stored in
a first memory segment to a plurality of splitter values; based
on the comparing, determining respective counts of ele-
ments of the set that will fit into each of a plurality of buckets
bounded by the splitter values; moving, to a second memory
segment that is smaller than the first memory segment, a
predetermined number of elements from each of a plurality
of ranges of the first memory segment that correspond to the
plurality of buckets; redistributing remaining elements from
at least some of the plurality of ranges of the first memory
segment across the plurality of ranges based on comparing
the remaining elements to the splitter values; and distribut-
ing the elements from the second memory segment across
the plurality of ranges based on comparing the elements to
the splitter values.

In various implementations, the method may further
include sampling, from the set of unsorted elements stored
in the first memory segment, a subset of the unsorted
elements; and analyzing the subset of the unsorted elements
to select the plurality of splitter values. In various imple-
mentations, the sampling may be random.

In various implementations, redistributing the remaining
elements may include: identifying the range of the first
memory segment having the least free space after the
moving; selecting γ elements from the identified range; and
redistributing the γ elements across the plurality of ranges
based on comparing the γ elements to the splitter values. In
various implementations, the method may include moving $b_i$
mod γ additional elements from at least one of the ranges of
the first memory segment that corresponds to a given bucket
i, of the plurality of buckets, that has $b_i$ elements.

In various implementations, the method may include
determining the plurality of ranges of the first memory
segment that correspond to the plurality of buckets. In
various implementations, determining the plurality of ranges
may include assigning read and write pointers to a portion of
the first memory segment that corresponds to a boundary
between two of the buckets. In various implementations, the moving may include shifting one or more of the read pointers by the predetermined number. In various implementations, redistributing the remaining elements from at least some of the plurality of ranges of the first memory segment may include shifting one or more of the write pointers.

In various implementations, the method may further include filtering out a given range of the plurality of ranges that does not include remaining elements. In various implementations, the filtering may include determining whether a read pointer assigned to the given range points to a first element of an adjacent range.

In a related aspect, a system may include one or more processors and memory storing instructions that, in response to execution by the one or more processors, cause the one or more processors to: compare elements of a set of unsorted elements stored in a first memory segment to a plurality of splitter values; based on the comparing, determine respective counts of elements of the set that will fit into each of a plurality of buckets bounded by the splitter values; move, to a second memory segment that is smaller than the first memory segment, a predetermined number of elements from each of a plurality of ranges of the first memory segment that correspond to the plurality of buckets; redistribute remaining elements from at least some of the plurality of ranges of the first memory segment across the plurality of ranges based on comparing the remaining elements to the splitter values; and distribute the elements from the second memory segment across the plurality of ranges based on comparing the elements to the splitter values.

In various implementations, the memory may further include instructions to sample, from the set of unsorted elements stored in the first memory segment, a subset of the unsorted elements; and analyze the subset of the unsorted elements to select the plurality of splitter values.

In various implementations, the instructions to redistribute may include instructions to: identify the range of the first memory segment having the least free space after the moving; select $\gamma$ elements from the identified range; and redistribute the $\gamma$ elements across the plurality of ranges based on comparing the $\gamma$ elements to the splitter values. In various implementations, the instructions may include instructions for moving $b_i \bmod \gamma$ additional elements from at least one of the ranges of the first memory segment that corresponds to a given bucket i, of the plurality of buckets, that has $b_i$ elements.

In various implementations, the memory may store instructions to determine the plurality of ranges of the first memory segment that correspond to the plurality of buckets. In various implementations, the instructions to determine the plurality of ranges may include instructions to assign read and write pointers to a portion of the first memory segment that corresponds to a boundary between two of the buckets.

In various implementations, the one or more processors may include a plurality of data processing units (DPUs). In some implementations, the plurality of DPUs may be coupled, tightly coupled, and/or loosely coupled, e.g., as a systolic array of DPUs. In various implementations, the one or more processors may include a plurality of cores. These cores each may have various amounts of private L2 cache, such as less than or equal to 1 MB, less than or equal to 512 KB, less than or equal to 256 KB, less than or equal to 128 KB, greater or equal to 64 KB, greater or equal to 128 KB, greater than or equal to 256 KB, greater than or equal to 256 KB etc. In some implementations, the L2 cache of the cores of the systolic array can comprise less than, for instance, 70%, 60%, 50%, 40%, 30%, 25%, 20%, 15%, or 10% of that of the core(s) of the CPU of the system.

In another related aspect, at least one non-transitory computer-readable medium may include instructions that, in response to execution by one or more processors, cause the one or more processors to: compare elements of a set of unsorted elements stored in a first memory segment to a plurality of splitter values; based on the comparing, determine respective counts of elements of the set that will fit into each of a plurality of buckets bounded by the splitter values; move, to a second memory segment that is smaller than the first memory segment, a predetermined number of elements from each of a plurality of ranges of the first memory segment that correspond to the plurality of buckets; redistribute remaining elements from at least some of the plurality of ranges of the first memory segment across the plurality of ranges based on comparing the remaining elements to the splitter values; and distribute the elements from the second memory segment across the plurality of ranges based on comparing the elements to the splitter values.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 5 schematically depicts a flowchart demonstrating an example of how techniques described herein may be carried out.

DETAILED DESCRIPTION

Figure 1:
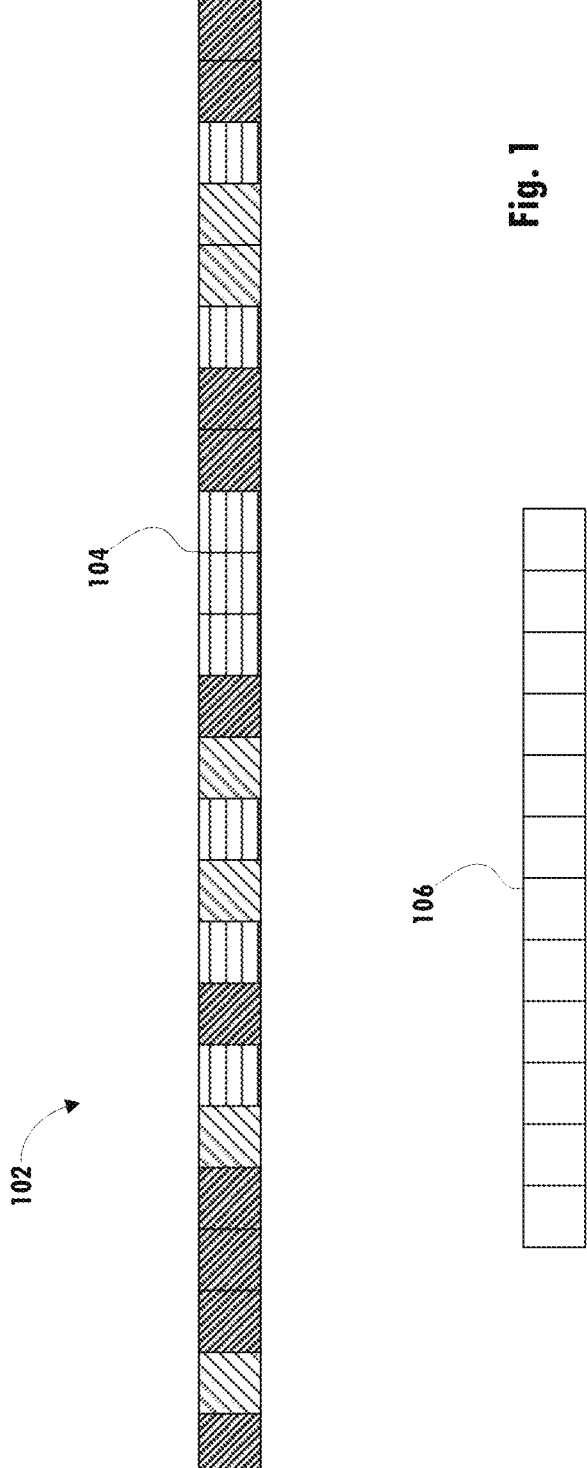
FIG. 1 schematically depicts an example scenario of an unsorted list of elements stored in a first memory segment and a second memory segment that will be used to implement in-place sorting as described herein.

Implementations described herein relate to improved in-place sample sorting of data. In various implementations, instead of using oracles to store bucket assignments, as is done with $S^3$-sort, in-place two-way partitioning may be performed between a first segment of memory that stores the data to be sorted and a second segment of memory that is significantly smaller than the first segment of memory (e.g., by order(s) of magnitude and/or growth). The second segment of memory may be used to temporarily store at least some elements of the unsorted data, while other elements remaining in the first memory segment are redistributed among a plurality of buckets defined (e.g., bounded) by a plurality of splitter values. In some implementations, once the elements that remained in the first segment of memory are redistributed, those elements that were temporarily stored in the second segment of memory may be distributed back to the first segment of memory.

In some implementations, an in-place sample sort technique with improved context length may proceed as follows.

During a "sampling" phase, if k buckets are desired for the n element unsorted list stored in the first memory segment, then k−1 splitters may be determined. In various implementations, the lower and upper bounds may be negative and positive infinity, respectively. A subset of s=a*k elements may be sampled (e.g., randomly) from the n unsorted elements, with a being an oversampling factor that allows for a tradeoff between cost of sampling and accuracy of the splitters. The sampled subset s of elements may be sorted, and k−1 splitter values may be sampled from the subset, e.g., at quartiles of the sorted subset, or at positions that are integer multiples of a.

During a "counting" phase, each element of the n element list is assigned to a bucket based on a comparison to the splitter values. In other types of sorting, the bucket assignments for each element are sometimes referred to as "oracles" that are preserved for later use. With various techniques described herein, however, these oracles are discarded during the counting phase and recomputed during a subsequent distribution phase. To finish the counting phase, the numbers of elements in each bucket ("bucket sizes") are counted, and these k bucket sizes are stored in a table B. In some implementations, read and write pointers may be assigned/set to positions in the first memory segment that correspond to the boundaries between buckets. For example, a first write pointer $w_0$ and a first read pointer $r_0$ may be assigned to the first memory location of the first memory segment. A second write pointer $w_1$ and a second read pointer $r_1$ may be assigned to a second memory location of the first memory segment. And so on.

During a "distribution" phase, a predetermined number X of elements are "moved" from each of a plurality of ranges of the first segment of memory that correspond to the plurality of buckets defined by the splitter values. For example, X elements may be "moved" from the start of each bucket/range to the second memory segment, which may be a temporary buffer in some cases. X can be any positive integer value, such as three, four, five, ten, etc. As used herein, "moving" and "removing" elements does not necessarily require deleting those elements. In some cases, the elements may remain stored in their original memory locations (and copied to other locations where applicable), but read and/or write pointers $w_i$ and $r_i$ used to access those elements may be adjusted so that those legacy values are not used or accessed. For example, if X=4, in some implementations, read pointers $r_i$ pointing to the beginning of each bucket/range may be incremented by four. Because γ (discussed below) elements will ultimately be redistributed from each range during a subsequent phase, it may be beneficial to handle bucket sizes that are not divisible by γ. Accordingly, in some implementations, $b_i$ mod γ additional elements may be "moved" from at least one of the ranges of the first memory segment that corresponds to a given bucket i, of the plurality of buckets, that has $b_i$ elements.

Next, elements remaining in the buckets/ranges of the first memory segment may be redistributed across the plurality of ranges/buckets in the first memory segment based on comparing the remaining elements to the splitter values. In some implementations, redistributing the remaining elements may include, at each iteration of multiple iterations, identifying the range of the first memory segment having the least free space after the moving; selecting γ elements from the identified range; and redistributing the γ selected elements across the plurality of ranges based on comparing the γ selected elements to the splitter values. In various implementations, γ may be a positive integer such as two, three, four, five, . . . , etc., and in some instances may be used as a number of elements that are to be processed in parallel. In some implementations, this redistribution may include shifting one or more of the write pointers as data is written to the first memory segment.

Once all the elements that remain in the first memory segment are redistributed, those elements temporarily stored in the second memory segment may be distributed into the first memory segment. More particularly, these elements may be distributed from the second memory segment across the plurality of ranges of the first memory segment based on comparing the elements to the splitter values. Distributing all elements from the second memory segment in this fashion results in a partitioned list of n elements.

Techniques described herein provide several technical advantages. Oracles used in other sorting techniques for storing bucket assignments impose considerable memory requirements. With techniques described herein, oracles are discarded, reducing memory requirements. Additionally, techniques described herein remove permutation operations that are performed in other sorting techniques. Moreover, blocking operations have been improved. Techniques described herein may be particularly beneficial for architectures having relatively small L2 caches per core, such as the x280 architecture mentioned previously that includes, in since instances, 256KB of pL2 cache per core. Implementing in-place, two-way partitioning allows for a total memory bandwidth usage of 3M with little to no in-cache data movement while using O(1) temporary storage. To the extent techniques described herein involve additional computations to achieve these results, systolic arrays of data processing units (DPUs) that may be integral with x280 architectures may minimize runtime impact.

FIG. 1 schematically depicts an example of an unsorted list 102 of n=24 elements stored in a first segment of memory 104. Each memory location is represented by a square, and the fill patterns used in the squares represent, in the abstract, unsorted elements. While n=24 elements are depicted in FIG. 1, this is not meant to be limiting. An unsorted list of elements on which techniques described herein can be applied can have any number of elements, and likely would have very large numbers of elements, such as millions or billions of elements.

A second memory segment 106 that is smaller than the first segment is also depicted. While depicted as being slightly smaller in FIG. 1, in reality, the second segment of memory 106 would likely be vastly smaller than the first segment of memory 104, e.g., by order(s) of growth and/or magnitude (e.g., O(γk log(k))). Second segment of memory 106 may be used as a temporary buffer for storing some elements from the unsorted list, as will be described below. First memory segment 104 and/or second memory segment 106 may be in the same type of memory or different types of memory. In some implementations, the first segment of memory 104 and/or second segment of memory 106 are part of processing unit(s) cache, such as part of L1, L2, private L2 ("pL2"), L3, and/or L4 cache. These processing units may include, for instance, DPUs, central processing unit(s) (CPUs), accelerators (which may or may not be implemented alongside CPU(s)), etc. In some implementations, second memory segment 106 may have a size that is selected based on the number of elements X that will be "removed" from each bucket/range during the distribution phase (described below) multiplied by the number of buckets k.

The sampling and distribution techniques described herein are "in-place." Accordingly, the correct size of the second memory segment 106 is required for the distribution phase described herein to work correctly "in-place", and the distribution phase working "in-place" is a primary factor in the operational efficiency of these techniques. In various implementations, the size of second memory segment 106, and hence, X, may be selected in various ways. In some implementations, X may be selected to guarantee that a bucket/range will never overflow, e.g., by setting X to $\gamma(k-1)$, plus up to $(\gamma-1)$ additional values for handling ranges/buckets with sizes not divisible by $\gamma$. As additional examples, X may be set to $\gamma(k/2)$, ceiling $(\gamma(1+\frac{1}{2}+\frac{1}{3}+ \ldots +1/(k-1))$ (which is $O(\gamma \ln(k))$, etc. As a practical example, if k is set to 256 or smaller and $\gamma$ is set to at most 1024 bits (or 128 bytes), that means the second memory segment 106 can be 8 MB. One technical advantage of disclosed techniques is reducing the size X of the second memory segment. In some implementations, the extra space X needed for the second memory segment may only grow as $O(\gamma k \log(k))$.

Figure 2:
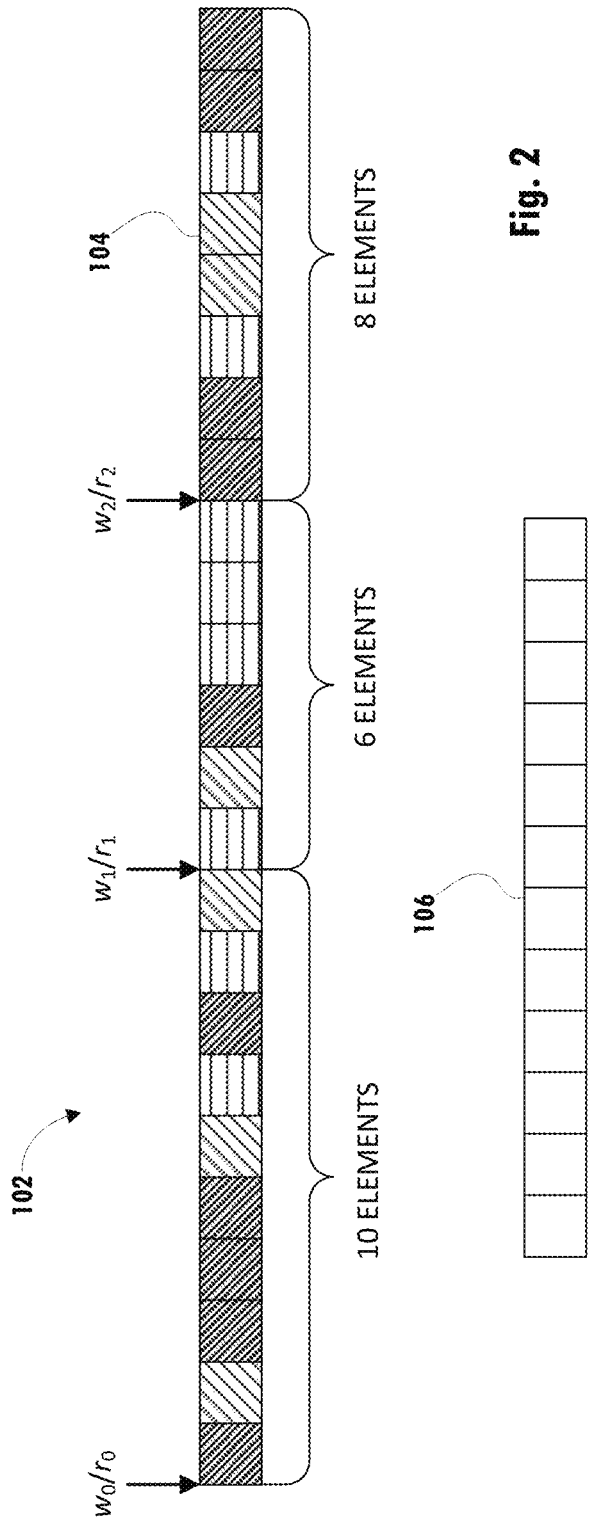
FIG. 2 depicts the example scenario of FIG. 1 after sampling and counting phases have completed.

FIG. 2 depicts the first segment of memory 104 after the sampling and counting phases described previously have been performed. In FIG. 2, a plurality of splitters have been sampled as described previously. The elements of unsorted list 102 have been compared to these sampled splitter values to count the number of elements that will end up in each of k buckets (or "bins") that are bounded by splitter value(s). In this example, twenty-four elements total are going to be distributed across k=3 buckets, with a first bucket containing ten elements, a second bucket containing six elements, and a third bucket containing eight elements. Put another way, during the counting phase, ten elements were deemed to be between negative infinity and a first splitter value, six elements were deemed to be between the first splitter value and a second splitter value, and eight elements were deemed to be between the second splitter value and positive infinity.

In real world examples there would most likely be far more elements total, and likely more buckets than depicted in the Figures. In some implementations, the sampling phase may be conducted in a manner that is most likely to yield equally sized buckets. As shown in FIG. 2, there is not a requirement that all bucket sizes be equal (although it may be advantageous to reach as close to equality as possible). Read pointers $r_0, r_1, r_2, \ldots$ and write pointers $w_0, w_1, w_2, \ldots$ are initialized at boundaries between where the buckets will ultimately reside once unsorted list 102 is sorted. The memory slots associated with these buckets will alternatively be described herein as "ranges" of first memory segment 104 that correspond to the buckets. For example, the first ten memory slots of first memory segment 104 are a first range, the second six memory slots of first memory segment 104 are a second range, and so forth.

Figure 3:
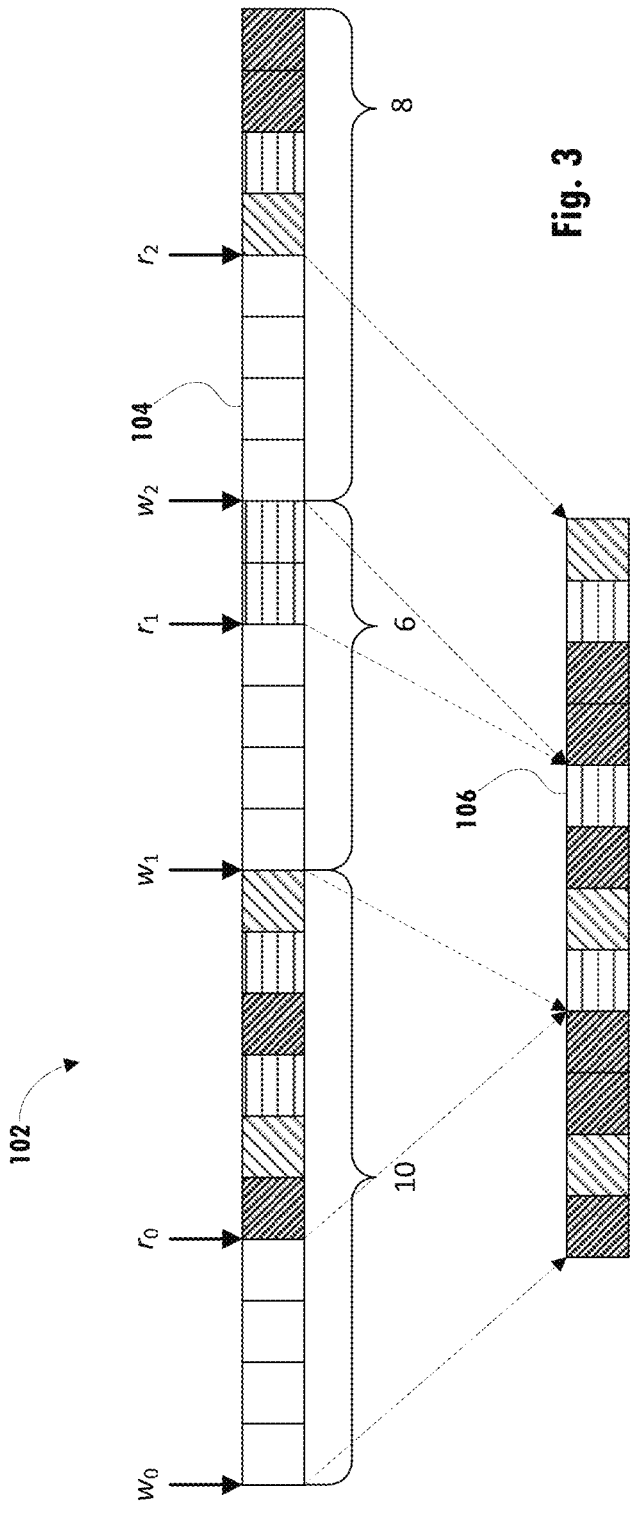
FIG. 3 depicts the example scenario of FIG. 1 during the first part of a distribution phase.

FIG. 3 schematically depicts an initial part of the distribution phase. X=4 elements have been "removed" from each range of first memory segment 104 that corresponds to an eventual bucket of elements. These "removed" elements have been "moved" at least temporarily to segment memory segment 106, as shown by the dashed arrows. As noted previously, "removing" elements from first memory segment 104 doesn't necessarily mean erasing those memory locations. For example, in FIG. 3, the read pointers $r_0, r_1, r_2, \ldots$ have each be incremented by X (four) memory locations/slots. As shown in FIG. 3, the result is that in the first range of memory locations corresponding to the first ten-element bucket, there are six elements remaining, in the second range of memory locations corresponding to the second six-element bucket, there are two elements remaining, and in the third range of memory locations corresponding to the third eight-element bucket, there are four elements remaining.

Figure 4:
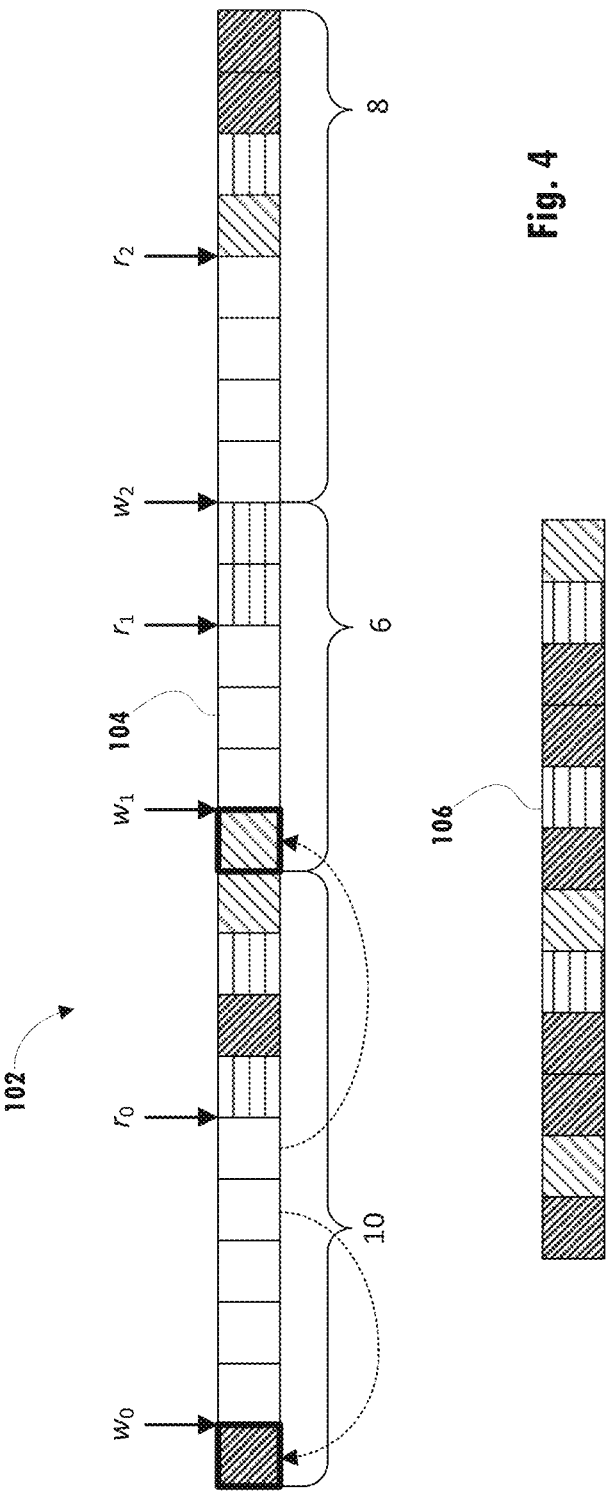
FIG. 4 depicts the example scenario of FIG. 1 during a subsequent part of a distribution phase.

Next, in various implementations, the remaining elements of at least some of the ranges of first memory segment 104 may be redistributed across others of the ranges based on comparing the remaining elements to the splitter values that bound the buckets. FIG. 4 schematically depicts how this might appear after one iteration. In various implementations, the range of first memory segment 104 having the least free space (e.g., $argmin(r_i - w_i)$ for all i in [0, k)) after X elements were "moved" from each range (as was depicted in FIG. 3) is identified. In the example of FIG. 4, all three ranges have four free memory slots, so the first range of ten elements is selected by default.

Next, $\gamma$ elements are selected (e.g., "removed" as described previously) from the "start" (left side in the figures) of the identified range and redistributed across the plurality of ranges based on comparing the $\gamma$ elements to the splitter values. In the current working example, $\gamma$ is set to two. Accordingly, and as demonstrated by the dashed arrows and bolding in FIG. 4, one element of the first range is redistributed to the first memory slot of the first range of first memory segment 104 based on that element being compared to the splitter values. Likewise, a second element of the first range is redistributed to the first memory slot of the second range of first memory segment 104 based on that element being compared to the splitter values. It can be seen that read pointer $r_0$ has been incremented by two memory locations to account for the two removed elements, and write pointers $w_0$ and $w_1$ have been used to write these values and then incremented to the next empty memory slot.

In some implementations, the process may be repeated until each read pointer $r_i$ has reached the boundary between its range and the next range. At this point, the elements that were moved to second memory segment 106 previously may then be distributed across free memory slots of first memory segment 104 (i.e., free slots at the end, or right side, or each range) by comparing them to the splitter values. This may result in each range/bucket being sorted relative to other ranges buckets, but individual elements within each range/bucket may not yet be sorted. Accordingly, the process may be applied recursively to each range/bucket (and to sub-ranges/sub-buckets within), until a final distribution can be made from the second memory segment 106 to the first memory segment 104. After this final distribution of elements from the second memory segment 106 to the first memory segment 104, the result is a sorted list of n elements stored in first memory segment 104.

Referring now to FIG. 5, an example method 500 of practicing selected aspects of the present disclosure is described. For convenience, flowchart operations are described in reference to a system that performs the operations. This system may include various components of various computer systems, including those depicted in FIG. 1. Moreover, while operations of method 500 are shown in a particular order, this is not meant to be limiting. One or more operations may be reordered, omitted or added.

Blocks 502-504 may correspond to the "sampling" phase described previously. At optional block 502, the system may sample, from a set of unsorted elements (e.g., 102) stored in a first memory segment (e.g., 104), a subset s of s=a*k elements, with a being the oversampling factor mentioned previously and k being the target number of buckets/ranges. In various implementations, this sampling may be random, simple, stratified, cluster-based, systematic, etc.

At block 504, the system may analyze the subset of the unsorted elements to select k–1 splitter values. In some implementations, the plurality of splitter values may be selected based on quartiles. Additionally or alternatively, the k–1 splitter values may be selected by sorting the s samples and extracting the elements at memory locations that are positive integer multiples of a.

Blocks 506-508 correspond to the "counting" phase mentioned previously. At block 506, the system may compare elements of the set of unsorted elements (e.g., 102) stored in the first memory segment (e.g., 104) to the k–1 splitter values. Based on this comparison, at block 508, the system may determine the respective counts of elements of the set that will fit into each of the k buckets bounded by the splitter values. In FIG. 2, for instance, buckets sizes of ten, six, and eight were counted. These bucket sizes may be used to select a plurality of ranges of first memory segment 104 that will ultimately be filled with elements that belong to the buckets, and thus correspond to the buckets.

Blocks 510-514 correspond to the "distribution" phase mentioned previously. At block 510, the system may move, to a second memory segment (e.g., 106) that is smaller than the first memory segment (e.g., 104), a predetermined number X of elements from each of the plurality of ranges of the first memory segment that correspond to the plurality of buckets. As noted previously, this may include, for instance, incrementing read pointers by X memory positions. Upon the operations of block 510, each range described previously will have X free memory locations, also referred to herein as "free space," at the beginning of the range.

At block 512, the system may redistribute remaining elements from at least some of the plurality of ranges of the first memory segment (e.g., 104) across the plurality of ranges based on comparing the remaining elements to the k–1 splitter values. For example, in some implementations, the system may identify the range of the first memory segment 104 having the least free space (or the first range if all have equal free space) and having more elements to redistribute. Ranges that have no more elements to redistribute may be filtered out. These ranges free of remaining elements may be identified, for instance, by determining whether a read pointer assigned to a given range points to a first element of an adjacent range.

Next, the system may then select γ elements from the identified range and redistribute the γ elements across the plurality of ranges based on comparing the γ elements to the splitter values. As noted previously, γ may be a positive integer such as two, three, four, five, . . . , etc., and in some instances may be used as a number of elements that are to be processed in parallel. In some implementations, the redistribution of block 512 of FIG. 5 may include shifting one or more of the write pointers as data is written to the first memory segment.

At block 514, the system may distribute the elements from the second memory segment (e.g., 106) across the plurality of ranges based on comparing the elements to the splitter values. Once all elements are distributed from the second memory segment back to the first memory segment in this manner, method 500 may be complete, and a partitioned list of n elements may remain in first memory segment 104. Techniques described herein (e.g., sampling, counting, distribution) may then be applied to these partitions recursively to generate further subpartitions, until the entire list is sorted. In some cases, when the partitions are sufficiently small, other sorting techniques may be used to complete the overall sorting, if desired.

After block 514, the whole original list of unsorted elements is not necessarily sorted. While each range or "partition" may include only elements that are smaller than ranges/partitions on one side and greater than ranges/partitions on the other side, within each range/partition, the elements may not be sorted relative to each other. Accordingly, the method 500 of FIG. 5 may be performed recursively on each unsorted partition. For example, at block 516, the system may determine whether unsorted ranges/partitions remain. If the answer is yes, then a next unsorted partition may be selected at block 518, and then method 500 may proceed back to block 502, where the operations 502-514 will be performed with respect to the current partition. This process may continue recursively until it is determined at block 516 that no more unsorted partitions remain. Method 500 may then end because the whole unsorted list that was provided initially will now be sorted.

Figure 6:
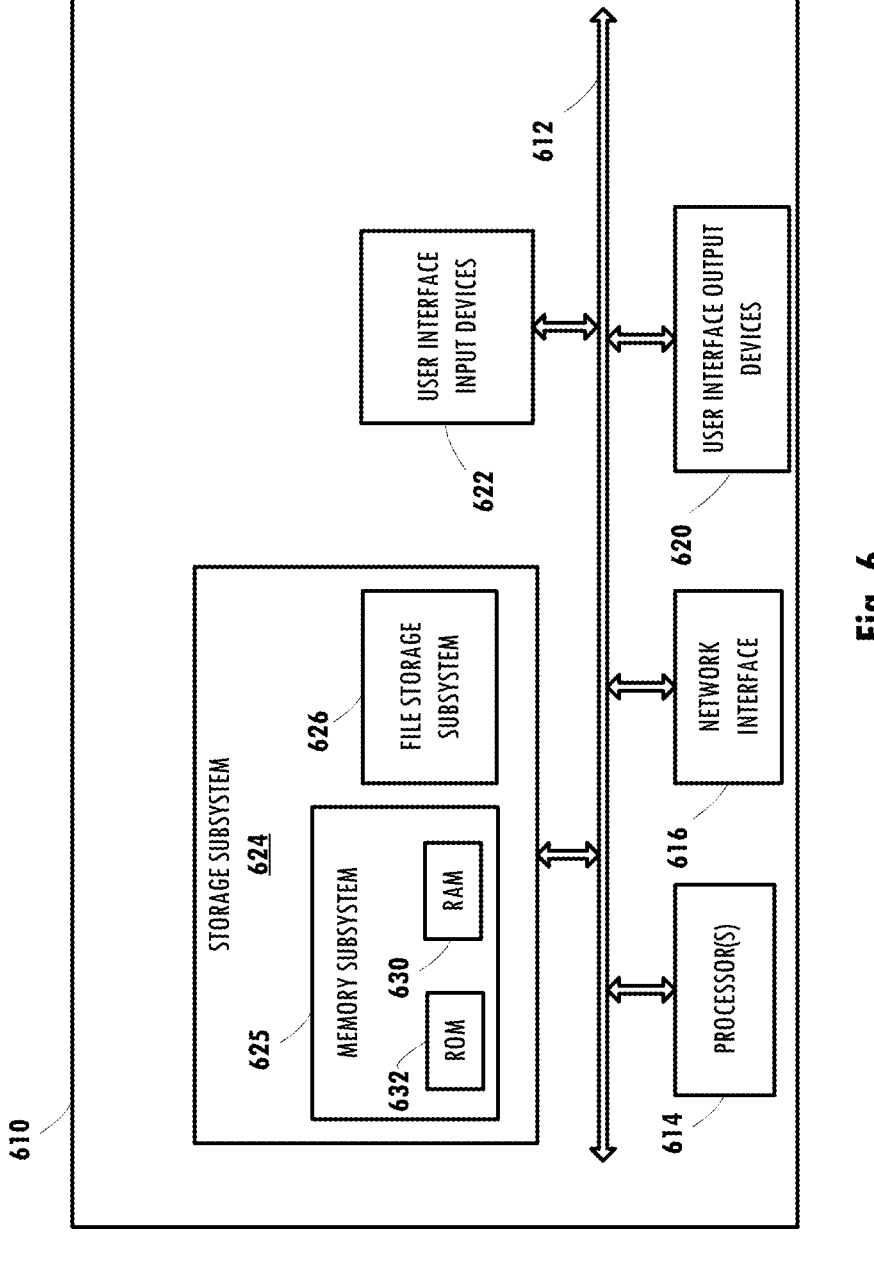
FIG. 6 schematically depicts an example architecture of a computer system.

FIG. 6 is a block diagram of an example computer system 610. Computer system 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computer system 610. Network interface subsystem 616 provides an interface to outside networks and is coupled to corresponding interface devices in other computer systems.

User interface input devices 622 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computer system 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 610 to the user or to another machine or computer system.

Storage subsystem 624 stores programming and data constructs that provide the functionality of some or all of the modules described herein. For example, the storage subsystem 624 may include the logic to perform selected aspects of method 500, and/or to implement one or more aspects of the various components depicted in FIG. 1. Memory 625 used in the storage subsystem 624 can include a number of memories including a main random-access memory (RAM) 630 for storage of instructions and data during program execution and a read only memory (ROM) 632 in which fixed instructions are stored. A file storage subsystem 626 can provide persistent storage for program and data files, and may include a hard disk drive, a CD-ROM drive, an optical drive, or removable media cartridges. Modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computer system 610 communicate with each other as intended. Although bus subsystem 612 is shown schematically as a single bus, alternative implementations of the bus subsystem may use multiple buses.

Computer system 610 can be of varying types including a workstation, server, computing cluster, blade server, server farm, smart phone, smart watch, smart glasses, set top box, tablet computer, laptop, or any other data processing system or computing device. Due to the ever-changing nature of computers and networks, the description of computer system 610 depicted in FIG. 6 is intended only as a specific example for purposes of illustrating some implementations. Many other configurations of computer system 610 are possible having more or fewer components than the computer system depicted in FIG. 6.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented using one or more processors and comprising:

comparing elements of a set of unsorted elements stored in a first memory segment to a plurality of splitter values;

based on the comparing, determining respective counts of elements of the set that will fit into each of a plurality of buckets bounded by the splitter values;

determining a predetermined number of elements to be moved from the first memory segment to a second memory segment that is smaller than the first memory segment;

moving, to the second memory segment, the same predetermined number of elements from each of a plurality of ranges of the first memory segment that correspond to the plurality of buckets;

while the predetermined number of elements remain in the second memory segment, redistributing remaining elements from at least some of the plurality of ranges of the first memory segment across the plurality of ranges based on comparing the remaining elements to the splitter values; and distributing the elements from the second memory segment across the plurality of ranges based on comparing the elements to the splitter values.

2. The method of claim 1, further comprising:

sampling, from the set of unsorted elements stored in the first memory segment, a subset of the unsorted elements; and analyzing the subset of the unsorted elements to select the plurality of splitter values.

3. The method of claim 2, wherein the sampling is random.

4. The method of claim 1, wherein redistributing the remaining elements comprises:

identifying the range of the first memory segment having the least free space after the moving;

selecting γ elements from the identified range; and redistributing the γ elements across the plurality of ranges based on comparing the γ elements to the splitter values.

5. The method of claim 4, further comprising moving $b_i$ mod γ additional elements from at least one of the ranges of the first memory segment that corresponds to a given bucket i, of the plurality of buckets, that has $b_i$ elements.

6. The method of claim 1, further comprising determining the plurality of ranges of the first memory segment that correspond to the plurality of buckets.

7. The method of claim 6, wherein determining the plurality of ranges comprises assigning-read and write pointers to a portion of the first memory segment that corresponds to a boundary between two of the buckets.

8. The method of claim 7, wherein the moving comprises shifting one or more of the read pointers by the predetermined number.

9. The method of claim 7, wherein redistributing the remaining elements from at least some of the plurality of ranges of the first memory segment comprises shifting one or more of the write pointers.

10. The method of claim 1, further comprising filtering out a given range of the plurality of ranges that does not include remaining elements.

11. The method of claim 10, wherein the filtering comprises determining whether a read pointer assigned to the given range points to a first element of an adjacent range.

12. A system comprising one or more processors and memory storing instructions that, in response to execution by the one or more processors, cause the one or more processors to:

compare elements of a set of unsorted elements stored in a first memory segment to a plurality of splitter values;

based on the comparing, determine respective counts of elements of the set that will fit into each of a plurality of buckets bounded by the splitter values;

determine a predetermined number of elements to be moved from the first memory segment to a second memory segment that is smaller than the first memory segment;

move, to the second memory segment, the same predetermined number of elements from each of a plurality of ranges of the first memory segment that correspond to the plurality of buckets;

while the predetermined number of elements remain in the second memory segment, redistribute remaining elements from at least some of the plurality of ranges of the first memory segment across the plurality of ranges based on comparing the remaining elements to the splitter values; and distribute the elements from the second memory segment across the plurality of ranges based on comparing the elements to the splitter values.

13. The system of claim 12, further comprising instructions to:

sample, from the set of unsorted elements stored in the first memory segment, a subset of the unsorted elements; and analyze the subset of the unsorted elements to select the plurality of splitter values.

14. The system of claim 12, wherein the instructions to redistribute comprise instructions to:

identify the range of the first memory segment having the least free space after the moving;

select $\gamma$ elements from the identified range; and redistribute the $\gamma$ elements across the plurality of ranges based on comparing the $\gamma$ elements to the splitter values.

15. The system of claim 14, further comprising instructions to move $b_i$ mod $\gamma$ additional elements from at least one of the ranges of the first memory segment that corresponds to a given bucket i, of the plurality of buckets, that has $b_i$ elements.

16. The system of claim 12, further comprising instructions to determine the plurality of ranges of the first memory segment that correspond to the plurality of buckets.

17. The system of claim 16, wherein the instructions to determine the plurality of ranges comprise instructions to assign read and write pointers to a portion of the first memory segment that corresponds to a boundary between two of the buckets.

18. The system of claim 12, wherein the one or more processors comprise a systolic array of data processing units (DPUs).

19. The system of claim 12, wherein the one or more processors comprise a plurality of cores, each having less than or equal to 256 KB of private L2 cache.

20. At least one non-transitory computer-readable medium comprising instructions that, in response to execution by one or more processors, cause the one or more processors to:

compare elements of a set of unsorted elements stored in a first memory segment to a plurality of splitter values;

based on the comparing, determine respective counts of elements of the set that will fit into each of a plurality of buckets bounded by the splitter values;

determine a predetermined number of elements to be moved from the first memory segment to a second memory segment that is smaller than the first memory segment;

move, to the second memory segment, the same predetermined number of elements from each of a plurality of ranges of the first memory segment that correspond to the plurality of buckets;

while the predetermined number of elements remain in the second memory segment, redistribute remaining elements from at least some of the plurality of ranges of the first memory segment across the plurality of ranges based on comparing the remaining elements to the splitter values; and distribute the elements from the second memory segment across the plurality of ranges based on comparing the elements to the splitter values.

\* \* \* \* \*